United States Patent
De Waegeneer et al.

(10) Patent No.: US 10,474,475 B2
(45) Date of Patent: Nov. 12, 2019

(54) NON-INTRUSIVE RESTART OF A TASK MANAGER

(71) Applicant: Western Digital Technologies, Inc., San Jose, CA (US)

(72) Inventors: Wim De Waegeneer, Ghent (BE); Len Henri Yvonne Buckens, Boekhoute (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/058,571

(22) Filed: Mar. 2, 2016

(65) Prior Publication Data

US 2017/0255473 A1 Sep. 7, 2017

(51) Int. Cl.
*G06F 9/46* (2006.01)
*G06F 9/445* (2018.01)
*G06F 9/48* (2006.01)

(52) U.S. Cl.
CPC ............ *G06F 9/445* (2013.01); *G06F 9/4843* (2013.01)

(58) Field of Classification Search
CPC ...................................................... G06F 9/445
See application file for complete search history.

(56) References Cited

U.S. PATENT DOCUMENTS

| | | | |
|---|---|---|---|
| 2002/0087668 A1* | 7/2002 | San Martin | G06F 8/65 709/221 |
| 2005/0240625 A1* | 10/2005 | Chang | G06Q 10/08 |
| 2005/0268298 A1* | 12/2005 | Hunt | G06F 9/4856 718/1 |
| 2007/0288532 A1* | 12/2007 | Yamazaki | G06F 11/1441 |
| 2008/0235364 A1* | 9/2008 | Gorbatov | G06F 1/3203 709/224 |
| 2010/0332657 A1* | 12/2010 | Elyashev | H04L 67/1002 709/226 |
| 2012/0167101 A1* | 6/2012 | Kandula | H04L 67/325 718/102 |
| 2013/0047164 A1* | 2/2013 | Ujibashi | G06F 9/4881 718/104 |
| 2014/0089393 A1* | 3/2014 | Druet | G06F 9/4856 709/203 |
| 2016/0092203 A1* | 3/2016 | Filali-Adib | G06F 8/67 717/171 |
| 2016/0283221 A1* | 9/2016 | Kochar | G06F 9/45558 |
| 2016/0360382 A1* | 12/2016 | Gross | G06F 3/0488 |

* cited by examiner

*Primary Examiner* — Sisley N Kim
(74) *Attorney, Agent, or Firm* — Patent Law Works LLP

(57) ABSTRACT

Techniques for restarting a task manager without affecting running and scheduled tasks are disclosed. The system includes an operating system which receives a request to restart a task manager with a first worker, wherein the first worker is actively processing a first task. The operating system transmits a signal to the first worker to continue processing the first task and terminate when the first task is complete. The operating system starts a new task manager with a new worker. The operating system updates an availability status of the new task manager to be available and an availability status of the task manager to be unavailable. The operating system assigns a new task to the new task manager based on the availability status associated with the new task manager.

21 Claims, 5 Drawing Sheets

NON-INTRUSIVE RESTART OF A TASK MANAGER

BACKGROUND

The present disclosure relates to task management. In particular, the present disclosure relates to restarting a task manager without affecting running and scheduled tasks.

Many computing systems include a task manager, which lists processes that access and perform tasks and coordinates processing of tasks. Sometimes a task manager needs to be restarted. Existing computing systems restart a task manager in two ways. In a warm shutdown, the computing system leaves running tasks in a task manager to continue. The task manager will not be restarted until all running tasks finish. Since the restart is delayed by waiting for all running tasks to be done, the warm shutdown also delays new tasks that need to be performed until after the restart. In a cool shutdown, the existing computing system kills all running tasks in the task manager and restarts the task manager. Since the currently running tasks are interrupted in the cool shutdown, these tasks need to be manually added to the task queue after the restart and to be performed again.

SUMMARY

The present disclosure relates to systems and methods for restarting a task manager without affecting running and scheduled tasks.

According to one innovative aspect, the subject matter described in this disclosure may be embodied in computer-implemented methods that include receiving a request to restart a task manager with a first worker, wherein the first worker is actively processing a first task; transmitting a signal to the first worker to continue processing the first task and terminate when the first task is complete; starting a new task manager with a new worker; updating an availability status of the new task manager to be available and an availability status of the task manager to be unavailable; and assigning a new task to the new task manager based on the availability status associated with the new task manager.

Other implementations of one or more of these aspects include corresponding systems, apparatus, and computer programs, configured to perform the actions of the methods, encoded on computer storage devices. It should be understood that the language used in the present disclosure has been principally selected for readability and instructional purposes, and not to limit the scope of the subject matter disclosed herein.

BRIEF DESCRIPTION OF THE DRAWINGS

The techniques of the present disclosure are illustrated by way of example, and not by way of limitation in the figures of the accompanying drawings in which like reference numerals are used to refer to similar elements.

DETAILED DESCRIPTION

Systems and methods for restarting a task manager without affecting running and scheduled tasks are described below. While the systems and methods of the present disclosure are described in the context of a particular system architecture, it should be understood that the systems and methods can be applied to other architectures and organizations of hardware.

Figure 1:
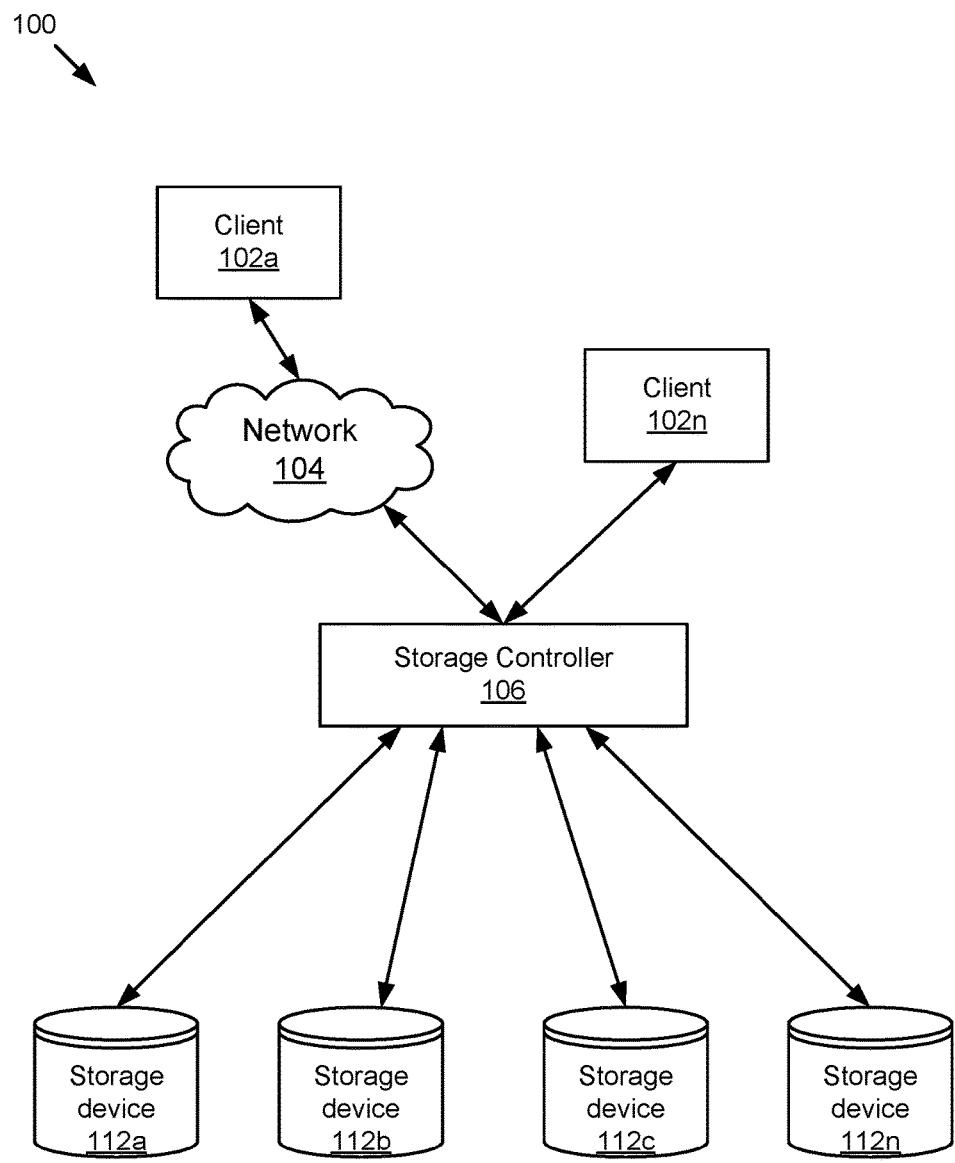
FIG. 1 is a high-level block diagram illustrating an example system including a storage subsystem having multiple storage devices and a storage controller.

FIG. 1 is a high-level block diagram illustrating an example system 100 including a storage subsystem having multiple storage devices and a storage controller. The system 100 includes clients 102a . . . 102n, a network 104, and a storage subsystem including a storage controller 106 and storage devices 112a . . . 112n.

The client devices 102a . . . 102n can be any computing device including a memory and one or more processors, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of making requests and receiving responses. A client device 102 may execute an application (e.g., a file transfer application, a data processing tool) to interact with the storage device 112. For example, the client device 102 may make a request to the storage device 112 for storing data, retrieving data, or processing data. Clients 102 may be directly coupled with storage sub-systems including individual storage devices (e.g., storage device 112a) or storage systems behind a separate controller.

In some embodiments, the system 100 includes a storage controller 106 that provides a single interface for the client device 102 to access the storage devices 112 in the storage system. The storage controller 106 may be a computing device configured to make some or all of the storage space on storage device 112 available to clients 102. As depicted in the example system 100, client devices can be coupled to the storage controller 106 via network 104 (e.g., client 102a) or directly (e.g., client 102n).

The network 104 can be a conventional type, wired or wireless, and may have numerous different configurations including a star configuration, token ring configuration, or other configurations. Furthermore, the network 104 may include a local area network (LAN), a wide area network (WAN) (e.g., the internet), and/or other interconnected data paths across which multiple devices (e.g., storage controller 106, client device 112, etc.) may communicate. In some embodiments, the network 104 may be a peer-to-peer network. The network 104 may also be coupled with or include portions of a telecommunications network for sending data using a variety of different communication protocols. In some embodiments, the network 104 may include Bluetooth (or Bluetooth low energy) communication networks or a cellular communications network for sending and receiving data, including via short messaging service (SMS), multimedia messaging service (MMS), hypertext transfer protocol (HTTP), direct data connection, WAP, email, etc.

Although the example of FIG. 1 illustrates one network 104, in practice one or more networks 104 can connect the entities of the system 100.

Figure 2:
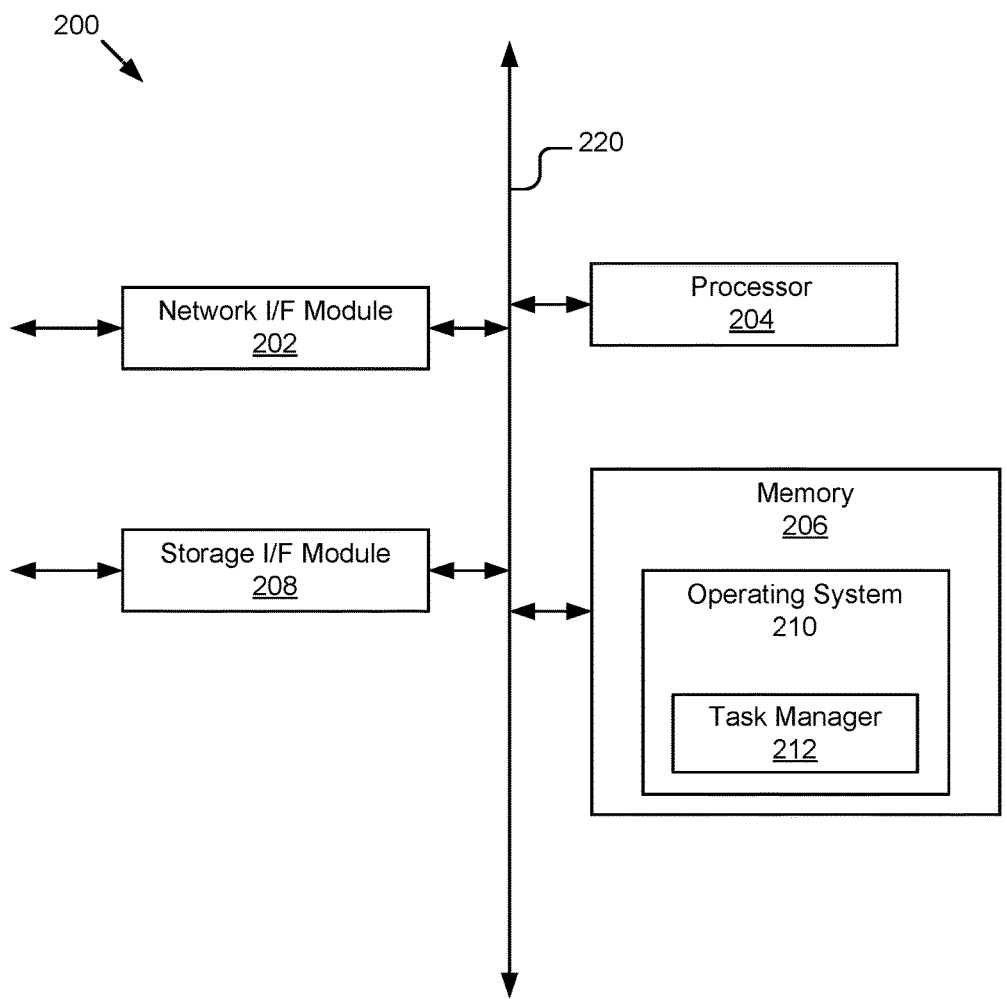
FIG. 2 is a block diagram illustrating an example system for use as a storage controller configured to implement the techniques introduced herein.

FIG. 2 is a block diagram illustrating an example computing system 200. In one embodiment, the computing system 200 may be a client device 102. In other embodiments, the computing system 200 may be a storage controller 106. In the example of FIG. 2, the computing system 200 includes a network interface (I/F) module 202, a processor 204, a memory 206, and a storage interface (I/F) module 208. The components of the computing system 200 are communicatively coupled to a bus or software communication mechanism 220 for communication with each other.

The network interface module 202 is configured to connect system 200 to a network and/or other system (e.g., network 104). For example, the network interface module 202 may enable communication through one or more of the internet, cable networks, and wired networks. The network interface module 202 links the processor 204 to the network 104 that may in turn be coupled to other processing systems. The network interface module 202 also provides other conventional connections to the network 104 for distribution and/or retrieval of files and/or media objects using standard network protocols such as TCP/IP, HTTP, HTTPS, and SMTP as will be understood. In some embodiments, the network interface module 202 includes a transceiver for sending and receiving signals using WiFi, Bluetooth®, or cellular communications for wireless communication.

The processor 204 may include an arithmetic logic unit, a microprocessor, a general purpose controller or some other processor array to perform computations and provide electronic display signals to a display device. In some embodiments, the processor 204 is a hardware processor having one or more processing cores. The processor 204 is coupled to the bus 220 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible.

The memory 206 stores instructions and/or data that may be executed by the processor 204. In the illustrated embodiment, the memory 206 includes an operating system 210. The operating system 210 includes a task manager 212. The memory 206 is coupled to the bus 220 for communication with the other components of the system 200. The instructions and/or data stored in the memory 206 may include code for performing the techniques described herein. The memory 206 may be, for example, non-transitory memory such as a dynamic random access memory (DRAM) device, a static random access memory (SRAM) device, flash memory, or some other memory devices. In some embodiments, the memory 206 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

Software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc.). The software communication mechanism 220 can be implemented on any underlying hardware, for example, a network, the Internet, a bus, a combination thereof, etc.

The storage I/F module 208 cooperates with the operating system 210 to access information requested by the client 102. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information. However, as illustratively described herein, the information is stored on storage device 112. The storage I/F module 208 includes a plurality of ports having input/output (I/O) interface circuitry that couples with the storage device over an I/O interconnect arrangement.

The operating system 210, stored on memory 206 and configured to be executed by the processor 204, is a component of system software that manages hardware and software resources in a computing system. For example, the operating system 210 is responsible for recognizing input from a keyboard, sending output to a display screen, tracking files on a disk, and controlling peripheral devices (e.g., a printer). The operating system 210 may also provide common services for computer programs such that applications and programs (e.g., an email application, a graphics edit tool) can function. In one embodiment, the operating system 210 is a general-purpose operating system. For example, the operating system 210 is Microsoft Windows or Linux installed on a personal computer. Or the operating system 210 is Android or iOS installed on a mobile phone. In another embodiment, the operating system 210 is a special-purpose operating system. For example, the operating system 210 is a Storage Virtualization Operating System (SVOS) that provides system element management and advances storage system functions.

In the illustrated embodiment, the operating system 210 is installed on a storage computing system and performs specific functions such as storage service-level controls, data deduplication, etc. As depicted in the example of FIG. 2, the operating system 210 also includes a task manager 212. The operating system 210 receives input from a user or an application, and schedules a task to be performed under control of the task manager 212. For example, the operating system 210 may start, stop, or restart the task manager 212 responsive to upgrade of a task manager. Although only a single task manager 212 is depicted in the example of FIG. 2, the operating system 210 may include multiple task managers 212.

The task manager 212, stored on memory 206 and configured to be executed by the processor 204, provides information about and coordinates processing of processes or tasks used in facilitating access to data stored on the storage device 112. In some embodiments, the task manager 212 is a parent process that includes at least one child process. A child process, such as "worker 1," "worker 2" or "worker 3" depicted in FIG. 5, can obtain a task from a shared queue and perform the task. For example, the task manager 212 includes worker 1. Worker 1 is a process that may perform a first task to search a document stored on the storage device 112 and perform a second task to transmit the document to the client 112 that requests the document.

In some embodiments, the operating system 210 cooperates with the task manager 212 to manage processes, for example, add processes, set priorities for processes, terminate processes, etc. The operating system 210 may also cooperate with the task manager 212 to display a list of processes on a user interface associated with the task manager 212 (not shown). The process information displayed to a user may include a process name, a process description, an amount of memory used by a process, an amount of time for which a central processing unit (CPU) is used by a process, etc. In some embodiments, the task manager 212 may also determine performance statistics based on the process information and display the performance statistics to a user. For example, the performance statistics may include a total amount of memory usage, disk usage, disk I/O speed, etc.

In other embodiments, the operating system 210 receives a request to restart the task manager 212 and restarts the task manager 212 without affecting the running or scheduled tasks in the task manager 212. In some embodiments, responsive to receiving the request, the operating system 210 communicates with the task manager 212 to determine whether there is a process in the task manager 212 that is actively performing a task. If there is no process that is actively performing a task, the operating system 210 initiates a new task manager. If there is a process that is actively performing a task, the operating system 210 leaves this process to continue performing the task and initiates a new task manager at the same time. The process continues running until the process successfully performs the task. At that time, the operating system 210 stops the task manager. During the time that the process is performing the task in the task manager, the operating system 210 no longer adds new processes to the task manager or makes any other changes to the task manager. Instead, the operating system 210 provides the new task manager access to new tasks in a shared queue, and enables a new process in the new task manager to obtain a new task from the shared queue and perform the new task.

This restart approach is advantageous in many ways. By allowing a running process remain unchanged, this approach avoids terminating or interrupting the running process by the restart of the task manager. By initiating a new task manager while a process is still running, this approach avoids the waiting time for the task to complete before the restart can be executed. As a result, this approach also avoids the waiting time for the task to complete before the new task manager can have access to new tasks and other resources, and thus minimizes any delay that may be caused by the restart of the task manager.

Further, although the restart approach described in this specification is mainly based on a storage computing system as depicted in FIG. 1, the restart approach described herein is applicable to any computing system that includes an operating system and a task manager.

Figure 3:
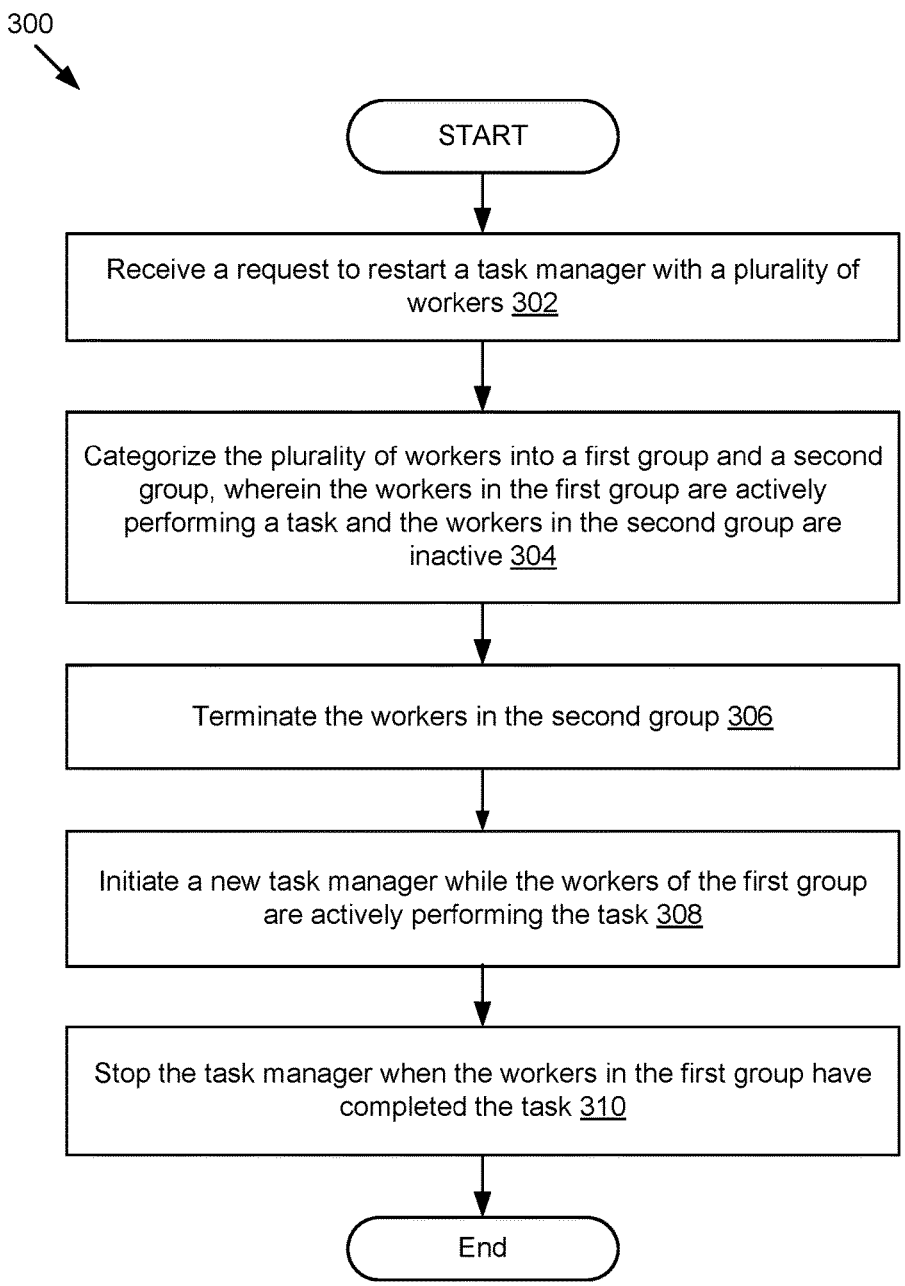
FIG. 3 is a flowchart of an example method for restarting a task manager without affecting running and scheduled tasks, according to the techniques described herein.

FIG. 3 is a flowchart of an example method 300 for restarting a task manager without affecting running and scheduled tasks. At 302, the operating system 210 receives a request to restart a task manager with a plurality of workers. As described above, a worker is a process that obtains a task from a shared queue and performs the task. For example, the worker may be a storage deduplication process that performs at least two tasks including: 1) determining redundant information from data stored on the storage device 112, and 2) eliminating duplicate data. In one embodiment, the request to restart the task manager may be triggered by a user action, for example, a user clicking a "restart task manager" button shown on a user interface. In another embodiment, the request to restart the task manager may be automatically generated based on a system event.

For example, the request may be automatically generated when an update of the task manager is to be installed.

In one embodiment, responsive to receiving the request to restart the task manager, the operating system 210 communicates with the task manager 212 to categorize 304 the workers into two groups, a first group where the workers are actively performing a task and a second group where the workers are inactive. In other words, the first group includes running processes and the second group includes free processes. In one embodiment, the operating system 210 transmits a signal to the first group to continue processing the task and terminate when the task is complete. The operating system 210 also transmits a signal to the second group to terminate. Responsive to the signal having been sent to the second group, at 306, the operating system 210 cooperates with the task manager to terminate the workers in the second group. Therefore, free processes are terminated immediately while running processes will be terminated when their currently running task completes.

At 308, the operating system 210 initiates a new task manager while the workers of the first group are actively performing tasks. In one embodiment, once signals have been sent to the first and second groups, the operating system 210 communicates with the task manager to spawn a new instance of the task manager (e.g., implementing updates, etc.). The operating system 210 starts the new task manager with new workers (i.e., processes). The operating system 210 enables these new processes to have access to new tasks, new code, latest APIs, and any changes that occur between receiving the request to restart the task manager and starting the new task manager. In the meantime, the operating system 210 denies the old task manager access to any new tasks except the tasks that are currently running.

At 310, the operating system 210 stops the task manager when the workers in the first group have completed their tasks. In some embodiments, if a currently running process fails to complete a task, the operating system 210 may start a new instance of the running process in the new task manager and complete the new instance of the task in the new task manager. For example, if the process that remains running in the task manager is a data retrieval process and this data retrieval process fails to get a file from a database, the operating system 210 may start a new instance of this data retrieval process in the new task manager and retry to get the file from the database. In some implementations, the retry may work because the new task manager allows the new process to access new resources.

Figure 4:
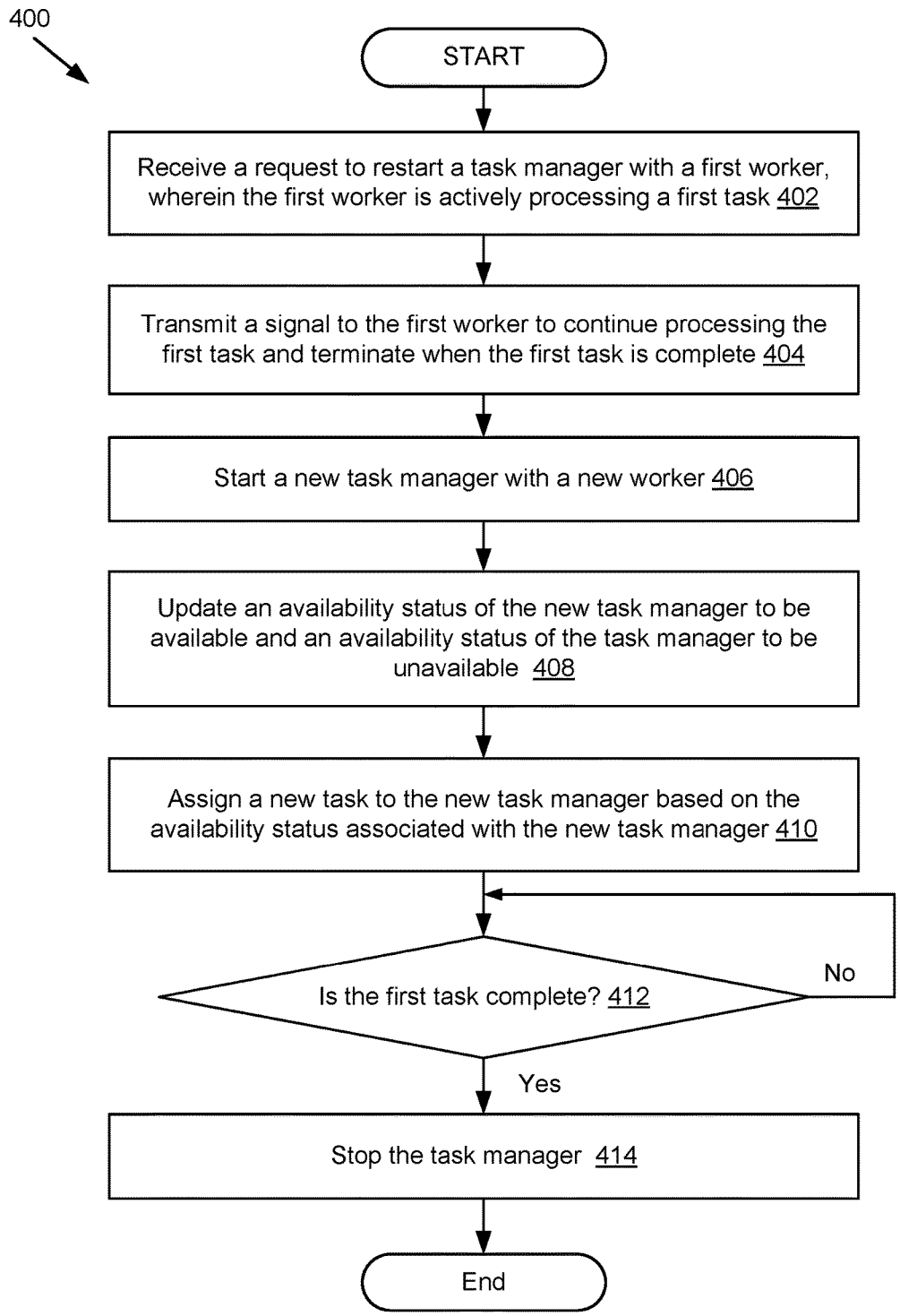
FIG. 4 is a flowchart of another example method for restarting a task manager without affecting running and scheduled tasks, according to the techniques described herein.

FIG. 4 is a flowchart of another example method 400 for restarting a task manager without affecting running and scheduled tasks. At 402, the operating system 210 receives a request to restart a task manager with a first worker, wherein the first worker is actively processing a first task. In one embodiment, the request to restart the task manager may be triggered by a user action, e.g., a selection of an option of "restart task manager" on a user interface associated with the task manager. In another embodiment, the request is automatically generated responsive to a system event, e.g., an application upgrade, a new application installation.

In some embodiments, the task manager is a parent process. The first worker is a child process that can perform a task obtained from a shared queue. In one embodiment, the operating system 210 may determine that the first worker is actively performing a first task based on the process information associated with the worker. For example, a large amount of memory used by the first worker at a first time may reflect that the worker is actively performing the first task (e.g., indexing a file, searching a file, opening a file, etc.). A small amount of memory used by the first worker at a second time may reflect that the first worker is inactive. In another embodiment, the operating system 210 may list the process running status in the user interface associated with the task manager. In yet another embodiment, the operating system 210 may determine that the first worker is scheduled to perform a first task at a time based on a schedule and determine that the first worker is actively performing the first task when the scheduled time comes.

At 404, the operating system 210 transmits a signal to the first worker to continue processing the first task and terminate when the first task is complete. Based on the signal, the first worker remains unchanged in the task manager before the first task is complete even if the task manager is requested to restart. Therefore, the restart of the task manager does not affect the first task that is running or scheduled to be running. In some embodiments, if the task manager also includes a second worker that is inactive when the request to restart the task manager is received, the operating system 210 transmits a signal to the second worker to terminate the second worker.

At 406, the operating system 210 starts a new task manager with a new worker. The new task manager may be a new instance of the task manager. For example, the new task manager may be an updated version of the task manager.

At 408, the operating system 210 updates an availability status of the new task manager to be available and an availability status of the old task manager to be unavailable. The first worker may still be actively performing the first task in the old task manager with the code used to perform the first task, the APIs called by the first task, and other resources used in performing the task remaining the same until the first task is complete. To minimize interruption, the task manager is unavailable as it no longer accepts new processes, performs new tasks or makes any change while allowing the first worker and relevant information to continue processing.

The operating system 210 initiates the new task manager when the workers continue performing the existing tasks in the old task manager. However, before the old task manager is terminated, the operating system 210 updates the availability status of the new task manager to show that the new task manager is available such that the new task manager has access to new code, new APIs, new tasks, and any new changes made responsive to receiving the request. At 410, the operating system 210 assigns a new task to the new task manager based on the availability status associated with the new task manager.

For example, the task manager may be running on a web server and to avoid interruption of service when a task manager is restarted, the operating system 210 starts the new task manager and the new task manager begins scheduling tasks before the old task manager is terminated.

At 412, the operating system 210 determines whether the first task is complete. If no, the operating system 210 returns to check the status of the first task until the first task is complete. If the first task is complete, the operating system 210 stops 414 the old task manager. For example, the operating system 210 may determine that the first task is complete because the first worker becomes an idle process. As a result, the operating system 210 stops the task manager.

In some embodiments, the operating system 210 also determines whether the first worker fails to complete the first task. For example, the operating system 210 may receive an error message indicating that the first task fails. In another example, the operating system 210 may determine that the first worker fails to complete the first task based on determining that the running time of the first worker exceeds a threshold time period. Responsive to determining that the first task fails, the operating system 210 may queue the first task to be processed by a worker in the new task manager. The worker in the new task manager can then retrieve the first task from the shared queue and process the task.

As has been described, responsive to a request to restart a task manager, the operating system 210 initiates a new task manager and shuts down an old task manager asynchronously. Initiating the new task manager before shutting down the old task manager and making the new task manager available ensure that no new processes get delayed or otherwise affected by the restart. Shutting down the old task manager after initiating the new task manager delays the termination of old processes and therefore ensures that no old processes get interrupted.

Figure 5:
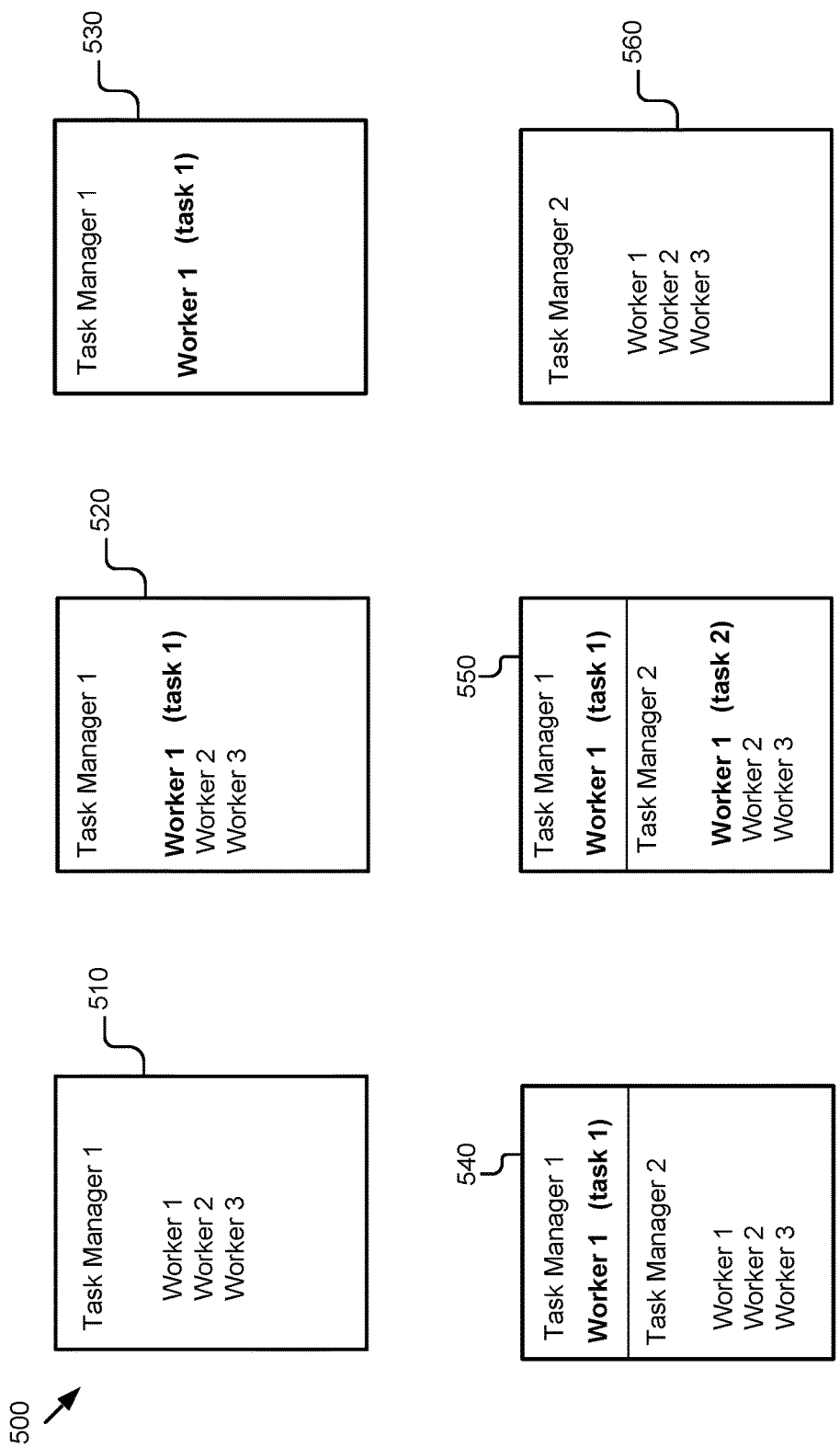
FIG. 5 is a block diagram illustrating a workflow of restarting a task manager, according to the techniques described herein.

FIG. 5 depicts a block diagram 500 illustrating a workflow of restarting a task manager. The example workflow shown in FIG. 5 includes six steps. At step 1, the operating system 210 receives a request to restart task manager 1. As shown in 510, task manager 1 includes three workers: worker 1, worker 2 and worker 3. A worker is a process that can obtain a task from a shared queue and perform the task. For example, the operating system 210 receives a request to restart task manager 1 to apply an update.

At step 2, the operating system 210 identifies that worker 1 is actively performing task 1 as shown in 520. In some embodiments, the operating system 210 may determine that task 1 is scheduled to be performed at a particular time or determine that the task is being performed based on resources used. The operating system 210 also determines that worker 2 and worker 3 are inactive, for example, based on the CPU usage, memory usage, etc.

At step 3, responsive to the request to restart task manager 1, the operating system 210 signals worker 1 to continue performing task 1 and terminate when task 1 is complete. As a result, in 530, the operating system 210 leaves worker 1 actively performing task 1 in the task manager 1. Responsive to the request to restart task manager 1, the operating system 210 also signals worker 2 and worker 2 to terminate. As a result, the operating system 210 removes worker 2 and worker 3 from task manager 1 in 530.

At step 4, the operating system 210 starts task manager 2 while worker 1 continues performing task 1 in task manager 1. As shown in 540, task manager 1 and task manager 2 are simultaneously running. Task manager 1 includes only worker 1 that is performing task 1. In fact, other than maintaining worker 1 to perform task 1, task manager 1 cannot take any new tasks or access any new resources since the operating system 210 has changed the availability status of task manager 1 from available to unavailable. Task manager 2 is a new instance of task manager 1. Task manager 2 includes three new workers: worker 1, worker 2 and worker 3, which are new instances of worker 1, worker 2 and worker 3 in task manager 1 respectively. In some embodiments, task manager 2 may also include new workers that are different from worker 1, worker 2 and worker in task manager 1. Once operating system 210 initiates task manager 2, the operating system 210 updates the availability status of task manager 2 to be available such that workers in task manager 2 have access to latest code, latest APIs, or any latest update.

At step 5, worker 1 in task manager 2 begins to perform task 2 from the shared task queue while worker 1 is still performing task 1 in task manager 1. As shown in 550, the old worker 1 is performing task 1 in old task manager 1. The new worker 1 is performing task 2 in the new task manager 2 based on the availability status of task manager 2 being available. The worker 2 and worker 3 in task manager 2 do not pick up any tasks from a shared queue and therefore are inactive.

At step 6, the operating system 210 determines whether task 1 is complete. The operating system 210 removes task manager 1 once task 1 is complete. Therefore there is only task manager 2 shown in 560. However, the operating system 210 may determine that worker 1 in task manager 1 fails to complete task 1. In this case, the operating system 210 may add a new instance of worker 1 in task manager 2 that accesses new code, new APIs to reprint a single-sided document.

Systems and methods for restarting a task manager without affecting running and scheduled tasks has been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   initializing, by one or more processors executing an operating system on a computer, a first instance of a task manager of the operating system, wherein the first instance of the task manager is managing a first process and a second process;
   receiving, by the one or more processors executing the operating system on the computer, a request to restart the task manager of the operating system on the computer, wherein the first process is actively processing a first task and the second process is inactive;
   transmitting, by the operating system on the computer, a signal to the first instance of the task manager managing the first process to continue processing the first task and terminate responsive to completing the first task;
   terminating, by the first instance of the task manager, the second process responsive to receiving the request to restart the task manager;
   starting, by the operating system on the computer, a second instance of the task manager with a new process while the first instance of the task manager managing the first process continues processing the first task;
   updating, by the operating system on the computer, an availability status of the second instance of the task manager to be available and an availability status of the first instance of the task manager to be unavailable; and
   assigning, by the operating system on the computer, a new task to the second instance of the task manager based on the availability status associated with the second instance of the task manager.

2. The computer-implemented method of claim 1, further comprising:
   determining, by the operating system on the computer, whether all active tasks managed by the first instance of the task manager are complete; and
   responsive to determining that all active tasks managed by the first instance of the task manager are complete, stopping the first instance of the task manager without affecting the second instance of the task manager.

3. The computer-implemented method of claim 1, wherein the new process is a new instance of the first process.

4. The computer-implemented method of claim 1, further comprising:
   determining whether the first process failed to complete the first task; and
   responsive to determining that the first process failed to complete the first task, queuing the first task to be processed by the new process.

5. The computer-implemented method of claim 1, further comprising:
   categorizing the first process into a first group based on the first process actively processing the first task;
   categorizing the second process into a second group based on the second process being inactive;
   transmitting a signal to the first group, including the signal to the first process, to continue processing active tasks and terminate responsive to completing the active tasks; and
   terminating processes of the second group responsive to receiving the request to restart the task manager.

6. The computer-implemented method of claim 1, wherein the request to restart the task manager is automatically generated responsive to a system event.

7. The computer-implemented method of claim 1, further comprising determining, by the operating system on the computer, that the first process is actively processing the first task based on an amount of memory used by the first process.

8. The computer-implemented method of claim 1, wherein the second instance of the task manager is an updated version of the task manager.

9. A computer system comprising:
   one or more processors; and
   a memory storing instructions that, when executed, cause the one or more processors to:
      implement an operating system on the computer system, the operating system configured to:
         receive a request to restart a task manager, the task manager managing a first process and a second process, wherein the first process is actively processing a first task and the second process is inactive;
         transmit a signal to a first instance of the task manager managing the first process to continue processing the first task and terminate responsive to completing the first task;
         terminate the second process responsive to receiving the request to restart the task manager;
         start a second instance of the task manager with a new process while the first instance of the task manager managing the first process continues processing the first task;
         update an availability status of the second instance of the task manager to be available and an availability status of the first instance of the task manager to be unavailable; and
         assign a new task to the second instance of the task manager based on the availability status associated with the second instance of the task manager.

10. The computer system of claim 9, wherein the operating system is further configured to:
    determine whether all active tasks managed by the first instance of the task manager are complete; and
    responsive to determining that all active tasks managed by the first instance of the task manager are complete, stop the first instance of the task manager without affecting the second instance of the task manager.

11. The computer system of claim 9, wherein the new process is a new instance of the first process.

12. The computer system of claim 9, wherein the operating system is further configured to:
   determine whether the first process failed to complete the first task; and
   responsive to determining that the first process failed to complete the first task, queue the first task to be processed by the new process.

13. The computer system of claim 9, wherein the operating system is further configured to:
   categorize the first process into a first group based on the first process actively processing the first task;
   categorize the second process into a second group based on the second process being inactive;
   transmit a signal to the first group, including the signal to the first process, to continue processing active tasks and terminate responsive to completing the active tasks; and
   terminate processes of the second group responsive to receiving the request to restart the task manager.

14. The computer system of claim 9, wherein the request to restart the task manager is automatically generated responsive to a system event.

15. The computer system of claim 9, wherein the operating system is further configured to determine that the first process is actively processing the first task based on an amount of memory used by the first process.

16. A system comprising:
   means for receiving a request to restart a task manager of an operating system on a computer, the task manager managing a first process and a second process, wherein the first process is actively processing a first task and the second process is inactive;
   means for transmitting a signal to a first instance of the task manager managing the first process to continue processing the first task and terminate responsive to completing the first task;
   means for terminating the second process responsive to receiving the request to restart the task manager;
   means for starting a second instance of the task manager with a new process while the first instance of the task manager managing the first process continues processing the first task;
   means for updating an availability status of the second instance of the task manager to be available and an availability status of the first instance of the task manager to be unavailable; and
   means for assigning a new task to the second instance of the task manager based on the availability status associated with the second instance of the task manager.

17. The system of claim 16, further comprising:
   means for determining whether all active tasks managed by the first instance of the task manager are complete; and
   means for stopping the first instance of the task manager without affecting the second instance of the task manager responsive to determining that all active tasks managed by the task manager are complete.

18. The system of claim 16, wherein the new process is a new instance of the first process.

19. The system of claim 16, further comprising:
   means for determining whether the first process failed to complete the first task; and
   means for queuing the first task to be processed by the new process responsive to determining that the first process failed to complete the first task.

20. The system of claim 16, further comprising:
   means for categorizing the first process into a first group based on the first process actively processing the first task;
   means for categorizing the second process into a second group based on the second process being inactive;
   means for transmitting a signal to the first group, including the signal to the first process, to continue processing active tasks and terminate responsive to completing the active tasks; and
   means for terminating processes of the second group responsive to receiving the request to restart the task manager.

21. The system of claim 16, further comprising means for determining that the first process is actively processing the first task based on an amount of memory used by the first process.

* * * * *